(12) United States Patent
Huang

(10) Patent No.: US 7,920,388 B2
(45) Date of Patent: Apr. 5, 2011

(54) FASTENING STRUCTURE FOR EXPANSION CARD

(75) Inventor: Wei-Xiao Huang, Taipei (TW)

(73) Assignee: Inventec Corporation, Taipei (TW)

( * ) Notice: Subject to any disclaimer, the term of this patent is extended or adjusted under 35 U.S.C. 154(b) by 424 days.

(21) Appl. No.: 12/249,617

(22) Filed: Oct. 10, 2008

(65) Prior Publication Data

US 2010/0091453 A1 Apr. 15, 2010

(51) Int. Cl.
*H05K 7/14* (2006.01)
*H05K 7/18* (2006.01)

(52) U.S. Cl. .................. 361/802; 361/801; 361/756

(58) Field of Classification Search .......... 361/600, 361/679.01, 679.02, 679.31, 679.32, 679.58, 361/737, 724–726, 748, 752–754, 756, 759, 361/784, 796, 800–803; 174/66, 67; 439/55, 439/76.1, 92, 95, 135, 296, 325, 327, 345, 439/350, 374, 377, 946
See application file for complete search history.

(56) References Cited

U.S. PATENT DOCUMENTS

| | | | | |
|---|---|---|---|---|
| 4,927,111 A | * | 5/1990 | Takahashi | 248/500 |
| 5,914,854 A | * | 6/1999 | Holt | 361/679.23 |
| 6,319,027 B1 | * | 11/2001 | Pickles et al. | 439/157 |
| 6,735,091 B2 | * | 5/2004 | Megason et al. | 361/801 |
| 7,310,241 B2 | * | 12/2007 | Peng et al. | 361/801 |
| 7,438,577 B2 | * | 10/2008 | Bridges et al. | 439/260 |

* cited by examiner

*Primary Examiner* — Hung S Bui
(74) *Attorney, Agent, or Firm* — CKC & Partners Co., Ltd.

(57) ABSTRACT

A fastening structure for an expansion card has a pair of blocks disposed in a case. Each block has a slit, and each slit is facing and parallel to the slit on the other block. When fastening the expansion card, two opposite sides of the expansion card may be engaged into the opening of the pair of slits. At least a locking tab having a dent is disposed on one block and may rotate around the block. When the locking tab rotates, the dent and the slit may be selectively aligned or misaligned. When the dent and the slit are aligned, they may form a continuous passage for a side of the expansion card slitting into. Or when they are misaligned, the sidewall of the dent may block up the slit.

19 Claims, 9 Drawing Sheets

US 7,920,388 B2

FASTENING STRUCTURE FOR EXPANSION CARD

BACKGROUND

1. Field of Invention

The present invention relates to a computer expansion card. More particularly, the present invention relates to a fastening device for fastening the expansion card.

2. Description of Related Art

In general, a motherboard of a computer may contain interface cards to connect and communicate with peripheral equipment and sockets to connect expansion cards. The number of expansion cards the motherboard may connect to is limited by the space inside the case of the computer.

Riser cards may be used to help connect more expansion cards. The riser card may vertically plug in a socket on the motherboard, while other expansion cards may horizontally plug in sockets on the riser card. By changing the direction of the expansion cards from vertical to horizontal, the motherboard may connect more expansion cards inside the computer.

Traditionally, the expansion may contain a metal plate disposed on the side thereof, which is called a bracket. The bracket may be fastened on a case of the computer to fixed the expansion card inside the case, which has limitation on the position and direction of the expansion card due to the shape of the case. Even if the riser card is used, the number of the connected expansion cards may not be sufficient to meet the user requirements and waste space inside the case.

Therefore, a new fastening structure for expansion cards and riser cards is needed. The new fastening structure is free from the shape of the case and may help use the space inside the case well.

SUMMARY

A fastening structure for an expansion card is provided. The fastening structure may fasten the expansion card in a case. The fastening structure has a pair of blocks disposed in the case. Each block has a slit, and each slit is facing and parallel to the slit on the other block, such that two opposite sides of the expansion card may be engaged into two slits. At least a locking tab is disposed in one block, wherein the locking tab may rotate around the block. The locking tab has a dent disposed thereon. When the locking tab rotates, the dent may rotate as well, and the dent and the slit may be selectively aligned or misaligned. In the first situation, the dent and the slit are aligned, and they may form a continuous passage for the side of the expansion card passing through. In the other situation, the dent and the slit are misaligned. The sidewall of the dent may block up the slit, and therefore the side of the expansion card may be fastened in the slit.

In the foregoing, the expansion card may be sandwiched by two slits, and the locking tab may lock the expansion card in the slits.

This invention also provides another fastening structure for an expansion card to replace a bracket of the expansion card. The fastening structure has a movable block and a fixed block in a case. The movable block connects to the case via a slide rail to move along the slide rail horizontally. The fixed block is fixed in the case. The movable block has a first slit for a first side of the expansion card vertically slitting into, and the fixed block also has a second slit for a second side of the expansion card vertically slitting into, wherein an opening of the second slit is facing and parallel to an opening of the first slit.

A first locking tab is disposed in the movable block to rotate around the movable block. When the first locking tab rotates, the first locking tab selectively may open the first slit for the side of the expansion card passing through, or may block up the first slit to stop movement of the expansion card.

In addition, a second locking tab is disposed in the fixed block to rotate around the fixed block. When the second locking tab rotates, the second locking tab may selectively open or block up the second slit.

When installing the expansion card, two steps should be done as follows. First, the first and the second locking tabs are rotated to open the first and the second slits, and the two opposite sides of the expansion card may be engaged into the first and the second slits. Then, the first and the second locking tabs are rotated again to block up the first and the second slits, and therefore fasten the expansion card between the movable block and the fixed block.

In the foregoing, the fastening structure in the embodiment of this invention is unlike the bracket, which must be disposed on or near a sidewall of the case. The position of the fastening structure is changeable, and therefore the space inside the case may be used more efficiently. In addition, the slits and the locking tab may help fastening the expansion card tightly.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
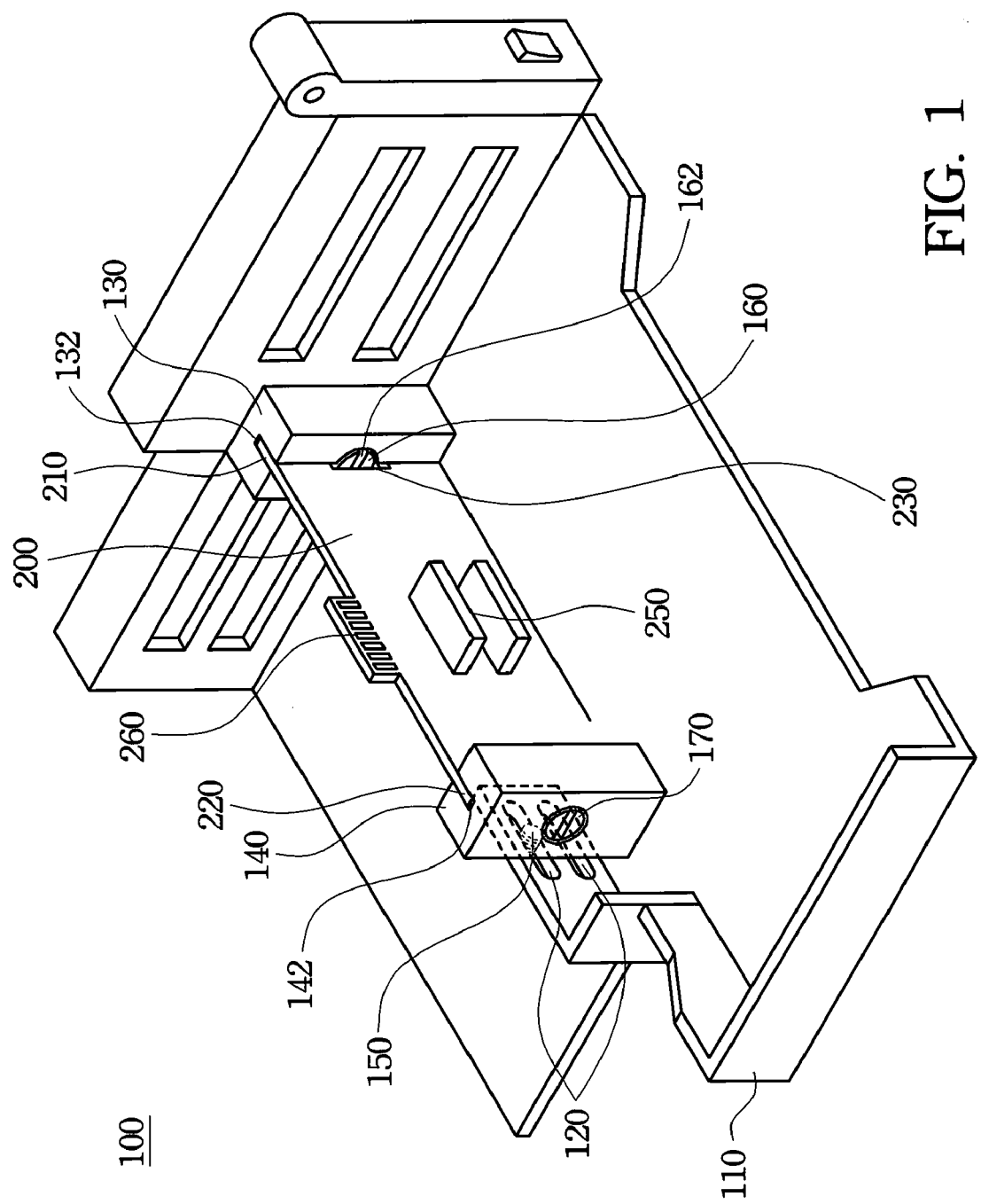
FIG. 1 is a three dimensional view of a fastening structure for an expansion card according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1. FIG. 1 is a three dimensional view of a fastening structure 100 for an expansion card 200 according to one embodiment of this invention. The fastening structure 100 has a case 110, a slide rail 120 disposed on an end of the case 110, a fixed block 130 fixed on the other end of the case 110, and a movable block 140 connected to the case 110 via the slide rail 120. The movable block 140 may move along the slide rail 120 horizontally.

The movable block 140 has a slit 142 disposed vertically thereon for a side of the expansion card 200 slitting into. The fixed block 130 also has a slit 132 disposed vertically thereon for another side of the expansion card 200 slitting into. The slit 132 is parallel to the slit 142, wherein an opening of the slit 132 is facing and parallel to an opening of the slit 142.

When installing the expansion card 200, a first side 210 of the expansion card 200 may vertically slide into the slit 142, and a second side 220 of the expansion card 200 may vertically slide into the slit 132, wherein the first side 210 and the second side 220 are a pair of opposite sides of the expansion card 200. In short, the expansion card 200 may move forward or backward to the bottom of the case 110.

The expansion card 200 may be an interface card, a memory card or an extender card. In the embodiment of this invention, the expansion card 200 is an extender card, also known as a riser card, which is used to increase sockets for motherboard (not shown). The connector 260 of the riser card physically and electrically connects the motherboard. Other expansion cards may physically and electrically connect to sockets 250 on the riser card, and through the riser card those expansion cards may electrically connect to the motherboard.

Because the size of different kinds of the expansion card 200 is different, the length of the fastening structure 100 is changeable to fit all different expansion cards 200. Specifically, the movable block 140 connects the slide rail 120 to move along the slide rail 120 horizontally. In the embodiment of this invention, the extension direction of the slide rail 120 is parallel to the direction from the movable block 140 to the fixed block 130. Therefore, the movable block 140 may move forward or backward to the fixed block 130, and furthermore, the distance between the movable block 140 and the fixed block 130 may be changed.

To maintain the distance between the movable block 140 and the fixed block 130, the fastening structure 110 has a fastening element 150 to fasten the slide rail 120 and the movable block 140. The fastening element 150 is disposed on the slide rail 120. The fastening element 150 is a reusable device, which means the fastening element 150 may be installed and removed repeatedly. The fastening element 150 may be a screw, a latch, a clasp or a button. After the movable block 140 is moved to a predetermined distance between the movable block 140 and the fixed block 130, the fastening element 150 may be used to fasten the movable block 140 and the slide rail 120. When amending the distance, the fastening element 150 may unlock to release the movable block 140.

The movable block 140 and the fixed block 130 may sandwich the expansion card 200 to limit horizontal movement of the expansion card 200. The fastening structure 100 further contains locking tabs 160 and 170 to be jammed in rabbets 230 on the expansion card 200 to limit vertical movement of the expansion card 200. Detail descriptions are described as follows.

Figure 2:
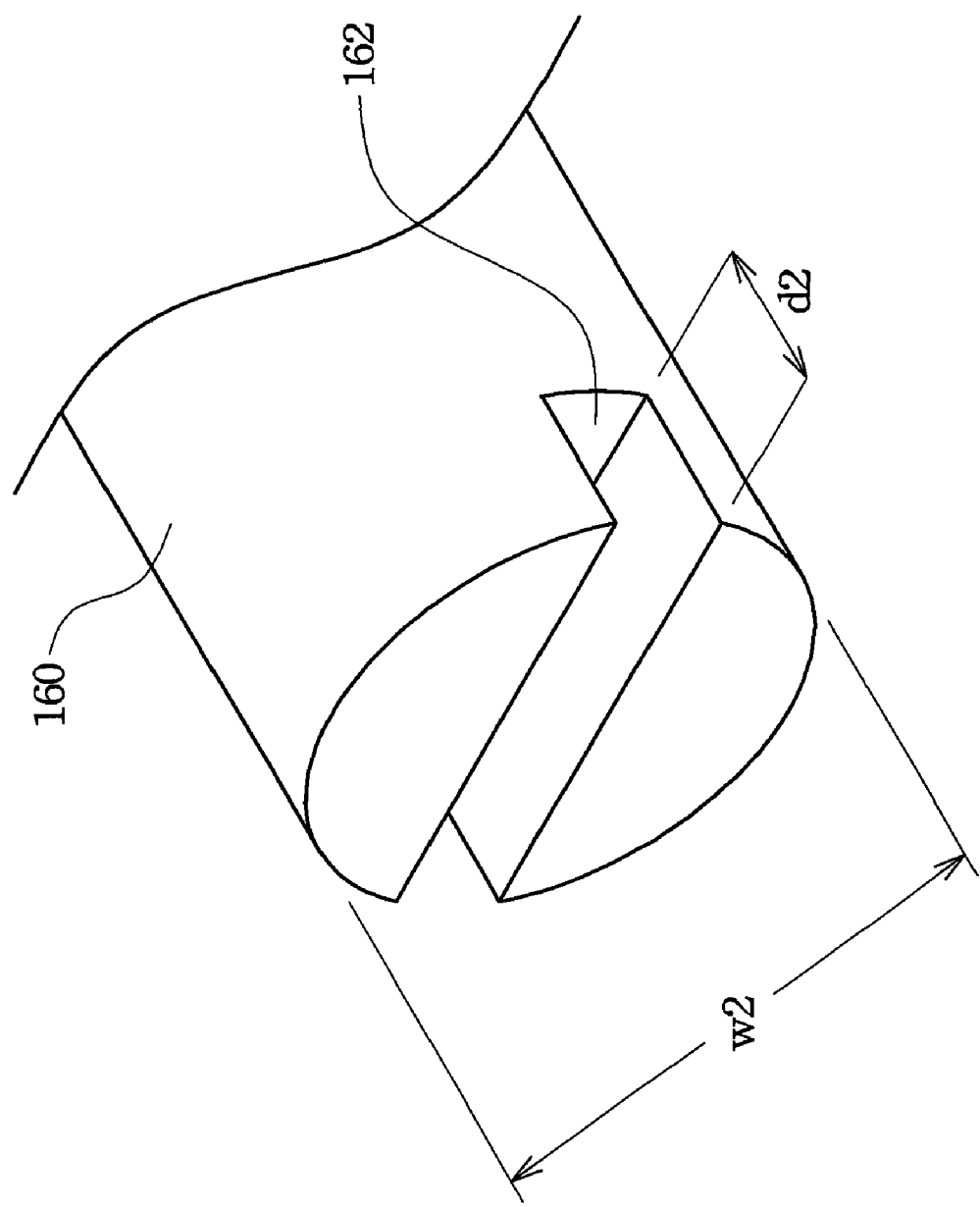
FIG. 2 is a three dimensional view of the locking tab shown in FIG. 1.
Figure 3A:
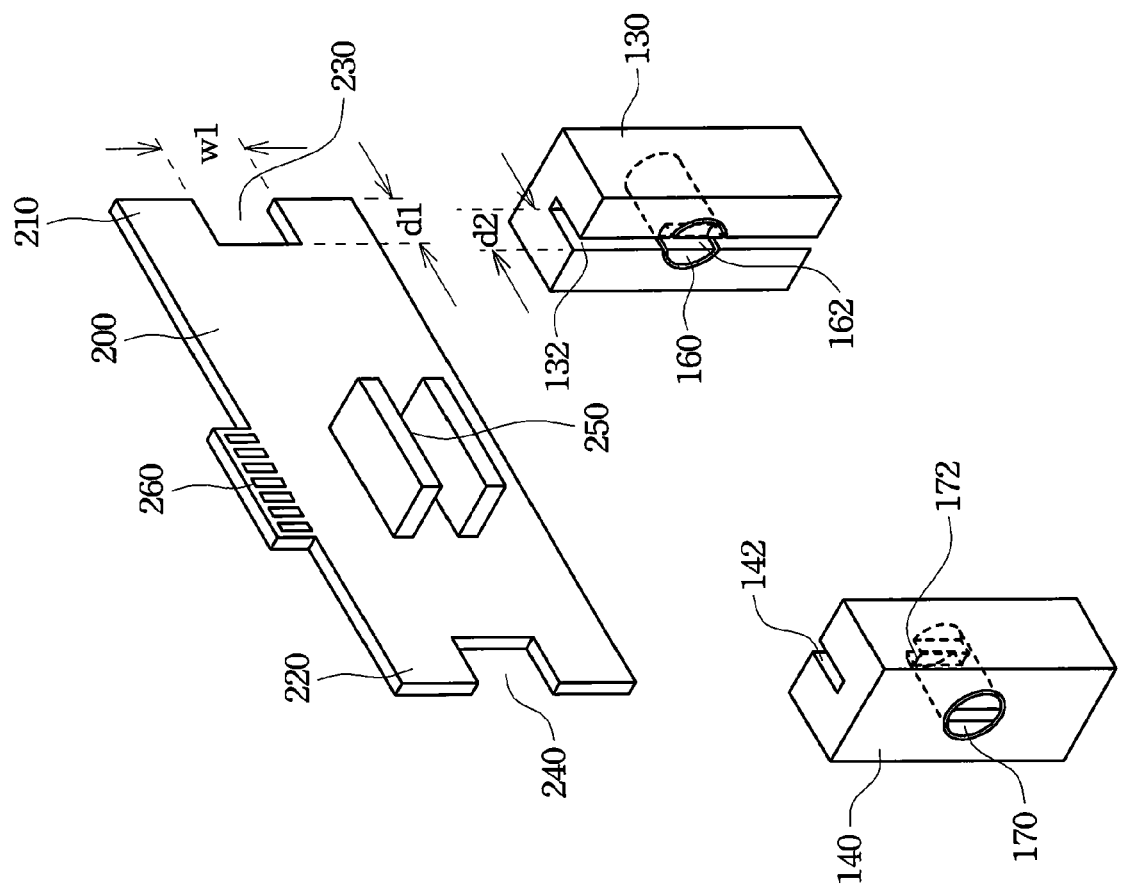
FIG. 3A is a three dimensional view of a portion of the fastening structure shown in FIG. 1 before the expansion card engaged into the slits.

Please refer to FIG. 2 and FIG. 3A. FIG. 2 is a three dimensional view of the locking tab 160 shown in FIG. 1. FIG. 3A is a three dimensional view of a portion of the fastening structure 100 and the expansion card 200 before the expansion card 200 engaged into the slits 132 and 142. The locking tab 160 is disposed in the fixed block 130, wherein the locking tab 160 may rotate around the fixed block 130. When the locking tab 160 rotates, the locking tab 160 may selectively open or block up the slit 132 on the fixed block 130.

Similarly, the movable block 140 has a locking tab 170 disposed thereon. The locking tab 170 may rotate around the movable block 140. When the locking tab 170 rotates, the locking tab 170 may selectively open or block up the slit 142 on the movable block 140.

In the embodiment of this invention, the locking tab 160 shapes and functions the same way as the locking tab 170. In the following description, only the locking tab 160 will be mentioned. However, the structure and the function of the locking tab 170 should be treated the same way as the locking tab 160.

The locking tab 160 has a dent 162 disposed thereon. When the locking tab 160 rotates, the dent 162 may rotate as well. In a situation, the locking tab 160 may rotate to make the dent 162 and the slit 132 being aligned, which means the extension direction of the dent 162 being parallel to the extension direction of the slit 132. The dent 162 and the slit 132 may form a continuous passage for the side 210 of the expansion card 200 passing through, as shown in FIG. 3A. In another situation, the locking tab 160 may be rotated to make the dent 162 and the slit 132 being misaligned, which means the extension direction of the dent 162 not parallel to the extension direction of the slit 132. The sidewall of the dent 162 may block up the slit 132, which may stop the side 210 of the expansion card 200 passing through.

The expansion card 200 has two rabbet 230 disposed separately on the side 210 and the side 220. The rabbets 230 may lock up with the locking tab 160 and 170. Specifically, when the side 210 of the expansion card 200 is engaged in the slit 132 on the fixed block 130, the locking tab 160 may rotate to make the dent 162 not parallel to the slit 132, and locking tab 160 may be jammed between the sidewalls of the rabbet 230 on the side 210, which may limit vertical movement of the expansion card 200.

In the embodiment of this invention, the locking tab 160 is in a shape of a cylinder, and the dent 162 is disposed on a circle surface of the locking tab 160. A width w2 of the locking tab 160 is a diameter of the circle surface. A height d2 of the dent 162 is about equal to the height of the slit 132.

The shape of the rabbet 230 may be the inverse of the shape of a cross section of the locking tab 160 such that the locking tab 160 may be fitted in the rabbet 230. In the embodiment of this invention, the rabbet 230 is a rectangle, wherein a width of a bottom of the rabbet 230 is equal to a width w1 of an opening of the rabbet 230.

The width w2 of a top of the locking tab 160 is about equal to or slightly shorter than the width w1 of the bottom of the rabbet 230, which may make the locking tab 160 tightly jammed in the rabbet 230. In the embodiment of this invention, the width w1 of the rabbet 230 is equal to the width w2 of the locking tab 160. Furthermore, the height d2 of the dent 162 is about equal to or slightly longer than the height d1 of the rabbet 230. In the embodiment of this invention, the height d2 of the dent 162 is equal to the height d1 of the rabbet 230.

Figure 3B:
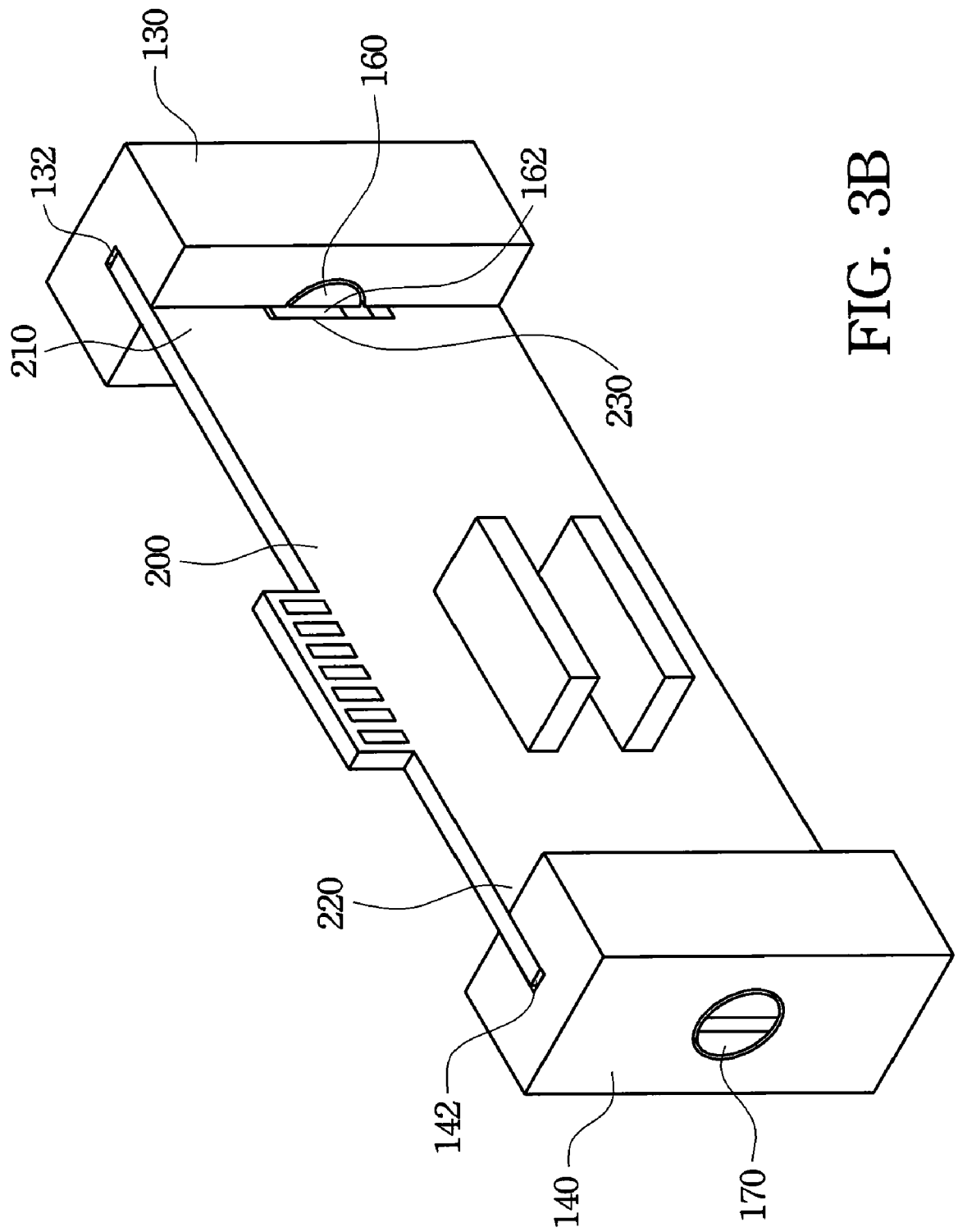
FIG. 3B is a three dimensional view of a portion of the fastening structure shown in FIG. 3A after the expansion card engaged into the slits.
Figure 3C:
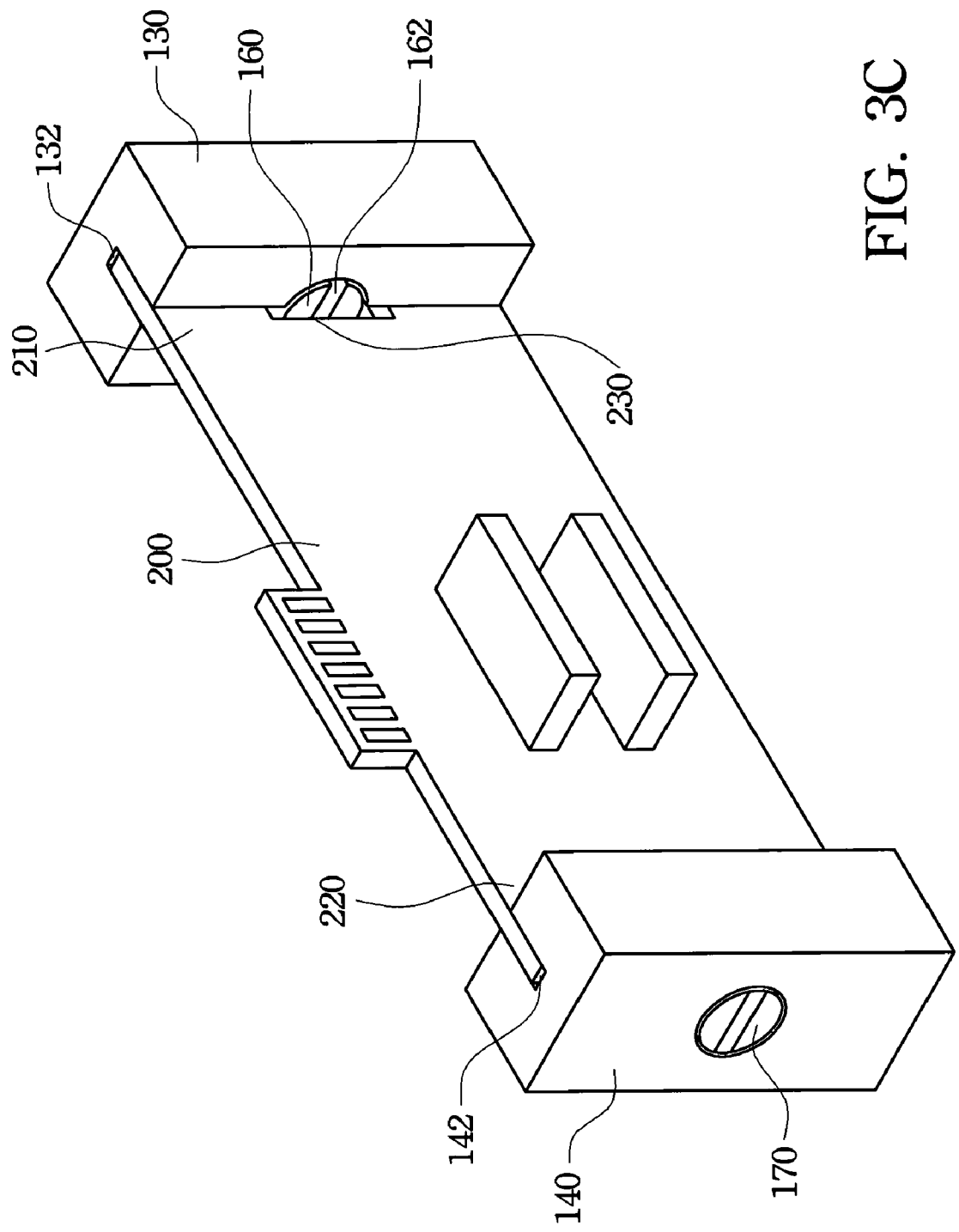
FIG. 3C is a three dimensional view of a portion of the fastening structure shown in FIG. 3B after the locking tab rotated.

Please refer to FIG. 3A, FIG. 3B, and FIG. 3C. FIG. 3A, FIG. 3B, and FIG. 3C are three dimensional views of a portion of the fastening structure 100 and the expansion card 200. FIG. 3A shows the situation before the expansion card 200 engaged into the slits 132 and 142, FIG. 3B shows the situation after the expansion card 200 engaged into the slits 132 and 142, and FIG. 3C shows the situation after the locking tabs 160 and 170 rotated.

In the first step, the locking tabs 160 may be rotated to let the dent 162 be parallel to the slit 132, and the locking tabs 170 may be rotated to let the dent 172 be parallel to the slit 142. Then, the side 210 of the expansion card 200 may pass through the dent 162 and slide in the slit 132, and the side 220 of the expansion card 200 may pass through the dent 172 and slide in the slit 142.

After the side 210 and the side 220 of the expansion card 200 slid and engaged in the slit 132 and the slit 142, the position of the rabbet 230 and 240 are immediate near the locking tab 160 and 170.

Then, the locking tab 160 may be rotated making the dent 162 not parallel to the slit 132 on the fixed block 130. The locking tab 160 may jammed in the rabbet 230, and the curved edge of the locking tab 160 may touch the sidewall of the rabbet 230, and furthermore, block up the slit 132.

Figure 4A:
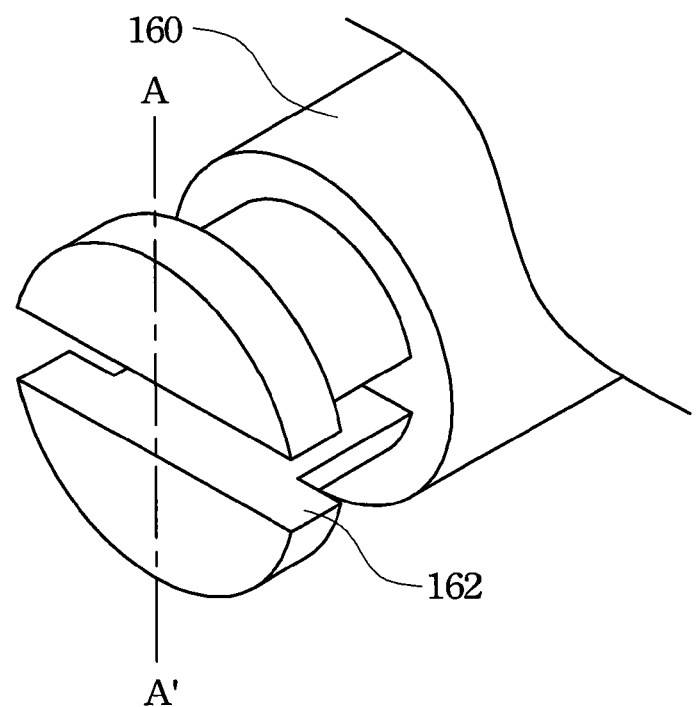
FIG. 4A is a three dimensional view of the locking tab according to another embodiment of this invention.
Figure 4B:
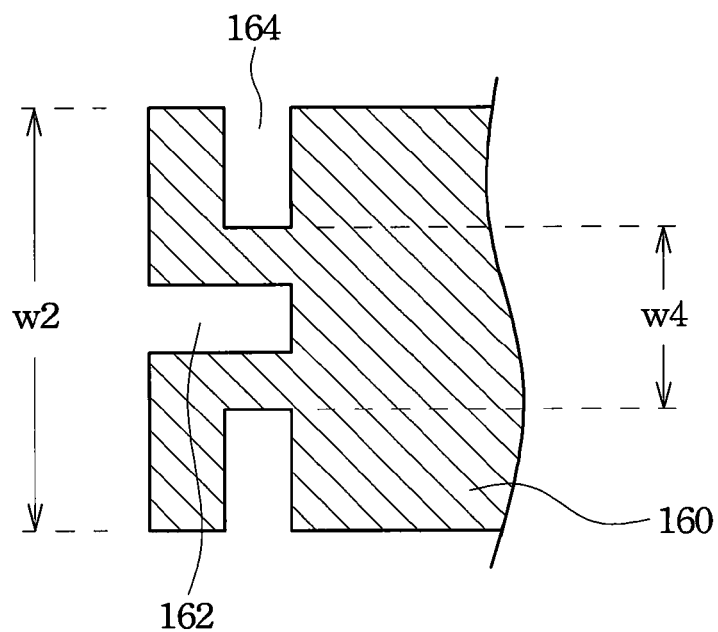
FIG. 4B is a cross sectional view of the locking tab according to the A-A' line shown in FIG. 4A.

Please refer to FIG. 4A and FIG. 4B. FIG. 4A is a three dimensional view of the locking tab 160 according to another embodiment of this invention. FIG. 4B is a cross sectional view of the locking tab 160 according to the A-A' line shown in FIG. 4A. The locking tab 160 has a dent 162 disposed on the circle surface and stretching inwardly. A curved side of the sidewall of the dent 162 is shaped to form a concave portion 164 near the bottom of the dent 162. Therefore, the width w2 of the top of the locking tab 162 is longer than the width w4 of the locking tab 162 near the bottom of the dent 162, and more particularly, the width w2 is longer than the width w4 of the concave portion 164.

Figure 5A:
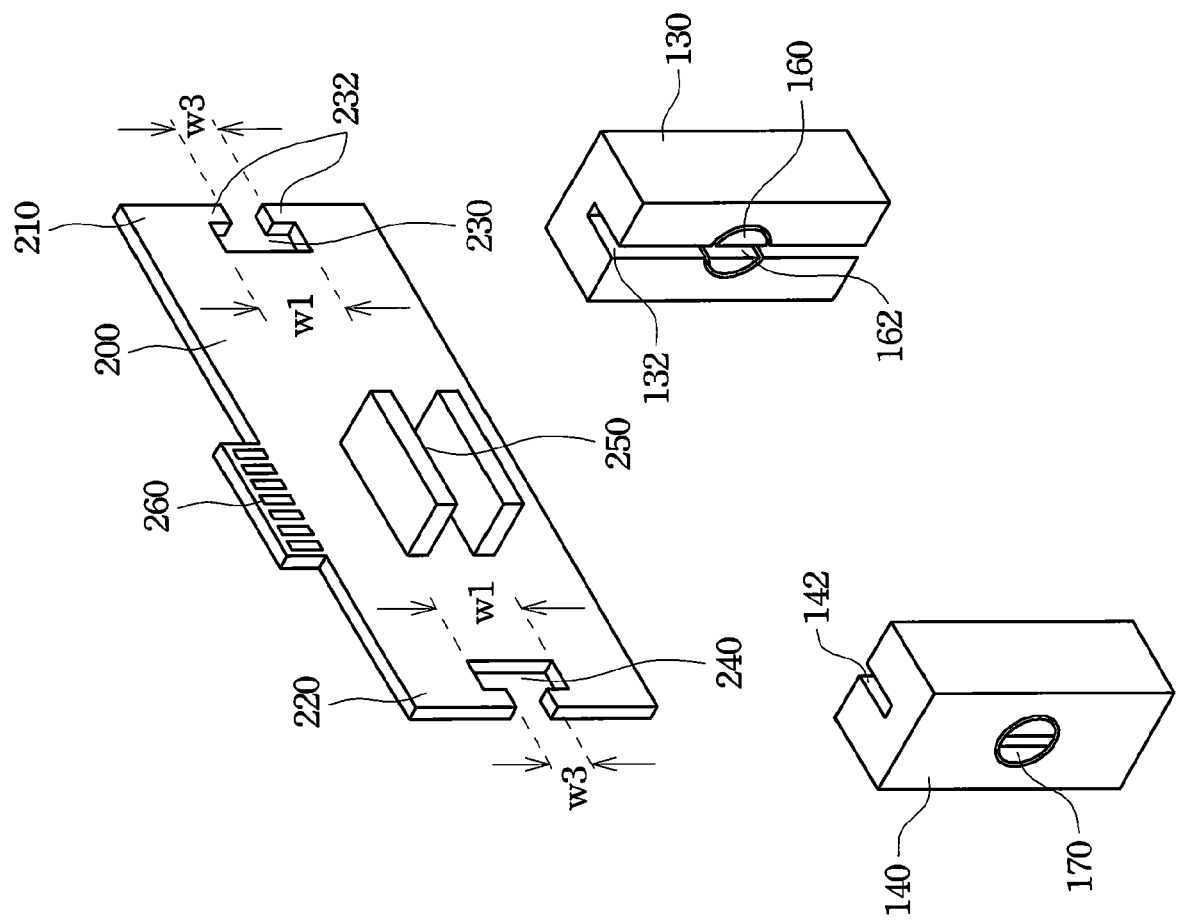
FIG. 5A is a three dimensional view of a portion of the fastening structure before the expansion card engaged into the slits according to another embodiment of this invention.
Figure 5B:
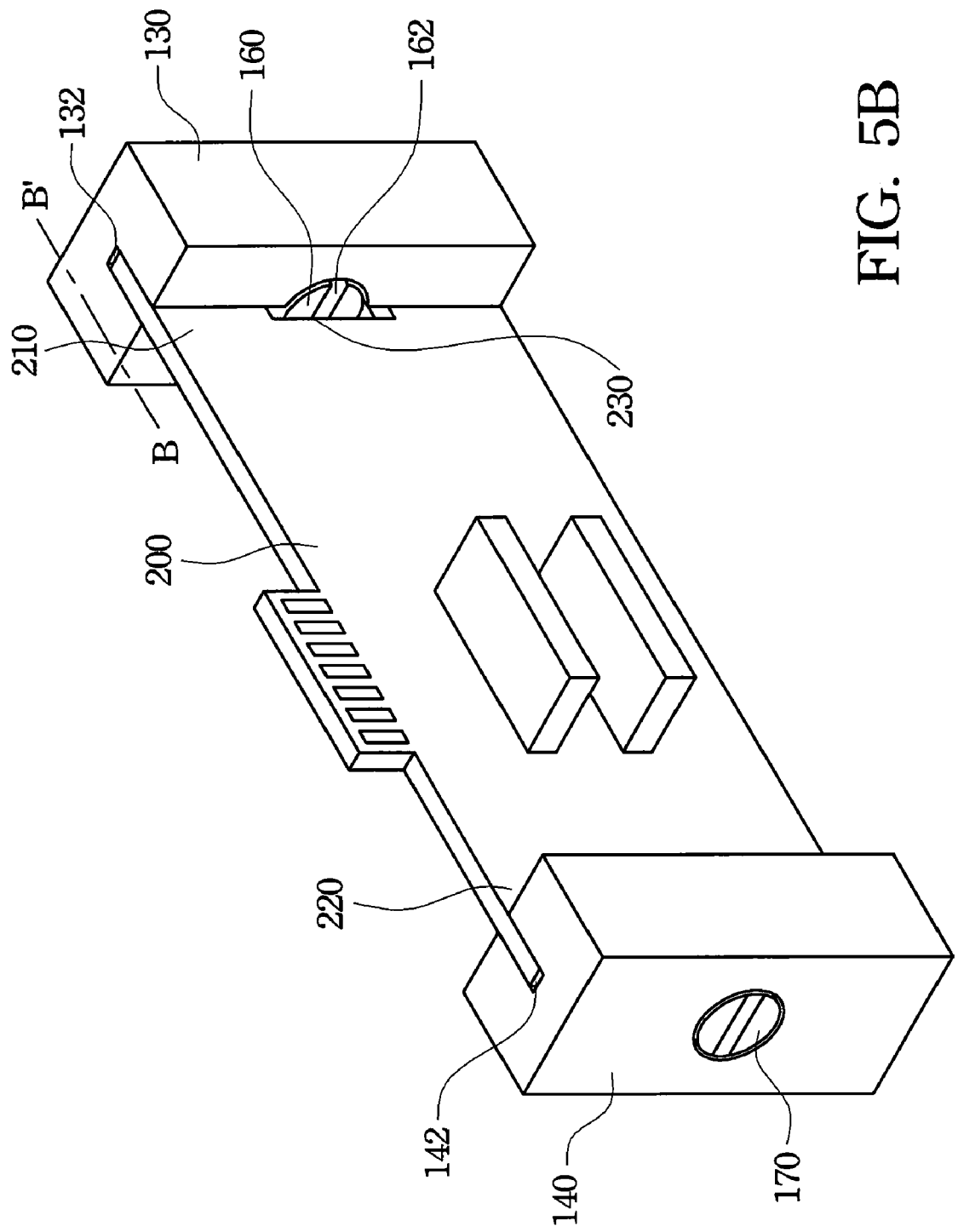
FIG. 5B is a three dimensional view of a portion of the fastening structure shown in FIG. 5A after the expansion card engaged into the slits and the locking tab rotated.
Figure 5C:
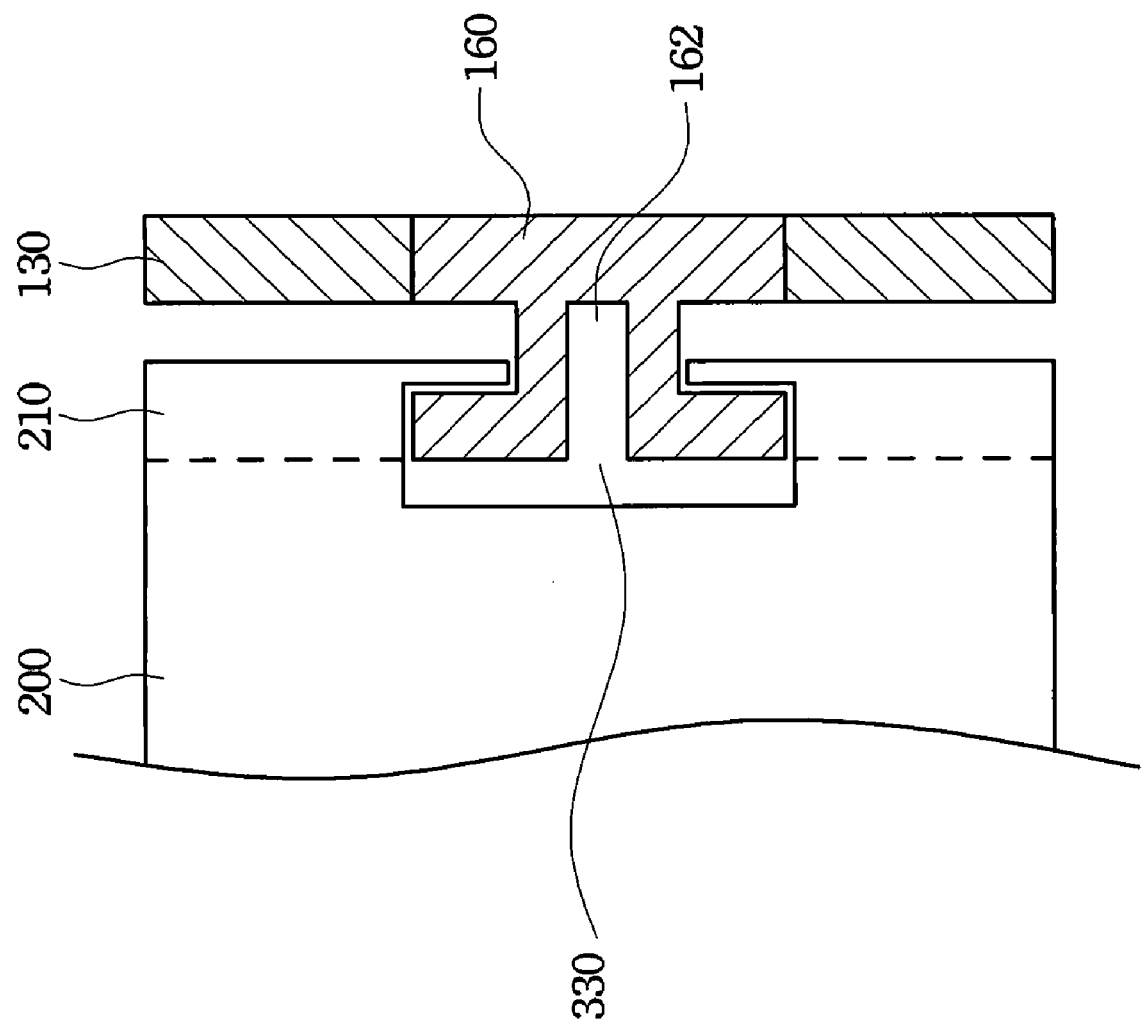
FIG. 5C is a cross sectional view of the locking tab according to the B-B' line shown in FIG. 5B.

Please refer to FIG. 4A to FIG. 5C. FIG. 5A is a three dimensional view of a portion of the fastening structure 100 before the expansion card 200 sliding into the slits 132 and 142. FIG. 5B is a three dimensional view of a portion of the fastening structure 100 after the expansion card 200 engaged into the slits 132 and 142 and the locking tabs 160 and 170 rotated. FIG. 5C is a cross sectional view of the locking tab 160 according to the B-B' line shown in FIG. 5B.

The shape of the rabbet 230 is inversed to the shape of the cross section of the locking tab 160. In the embodiment of this invention, the opening of the rabbet is contracted, which means the width w1 of a bottom of the rabbet 230 is longer than the width w3 of the opening of the rabbet 230. In specific, the rabbet 230 has bumps 232 disposed at the opening of the rabbet. Each bump 232 stretches from the sidewall of the rabbet 230 toward the center of the opening of the rabbet 230. When the locking tab 160 is jammed in the rabbet 230, the bumps 232 may be located inside the concave portion 164, and furthermore, the bumps 232 may be jammed in the concave portion 164. In the embodiment of this invention, the width w2 of the top of the locking tab 160 is longer than the width w3 of the opening of the rabbet 230.

In addition, the size of the rabbet 230 is slightly bigger than the locking tab 160 to allow the locking tab 160 rotating smoothly. In specific, the width w2 of the top of the locking tab 160 is about shorter than the width w1 of the bottom of the rabbet 230, and the width w4 of the concave portion 164 is slightly shorter than the width w3 of the opening of the rabbet 230.

Please notice that the structure of the locking tab 160 is the same as the locking tab 170 in the embodiment of this invention. The shape and the position of the rabbet 230 on the side 210 is quite the same as the rabbet 230 on the side 220.

In the foregoing, the fastening structure 100 can be position anywhere inside the case 110, which may help use the space inside the case 110 more efficiently.

The slit 132 on the fixed block 130 and the slit 142 of the movable block 140 may sandwich the expansion card 200 to limited the horizontal position of the expansion card 200. Because the movable block 140 may move forward or backward to the fixed block 130, the distance between the slits 132 and 142 may be changed to fix the size of the expansion card 200.

Furthermore, the locking tab 160 and 170 may jammed in the rabbets 230 on the expansion card 200, which may limit the vertical position of the expansion card 200.

Although the present invention has been described in considerable detail with reference certain embodiments thereof, other embodiments are possible. Therefore, their spirit and scope of the appended claims should no be limited to the description of the embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fastening structure for an expansion card, comprising:
   a pair of blocks disposed in a case, each block having a slit facing and parallel to the slit on the other block, and the slits are operated for two opposite sides of the expansion card slitting into; and
   at least a locking tab disposed in one of the blocks and having a dent disposed thereon, and when the locking tab being rotated around the block, the dent and the slit being selectively aligned or misaligned,
   when the dent and the slit being aligned, the dent and the slit forming a continuous passage for the side of the expansion card passing through, and when the dent and the slit being misaligned, a sidewall of the dent blocking up the slit.

2. The fastening structure of claim 1, further comprising at least a rabbet disposed on the side of the expansion card, wherein the locking tab is jammed in the rabbet when the sidewall of the dent blocks up the slit.

3. The fastening structure of claim 2, wherein a width of a bottom of the rabbet is equal to a width of an opening of the rabbet.

4. The fastening structure of claim 2, wherein a width of a bottom of the rabbet is longer than a width of an opening of the rabbet.

5. The fastening structure of claim 4, wherein a width of a top of the locking tab is about shorter than the width of the bottom of the rabbet and is longer than the width of the opening of the rabbet.

6. The fastening structure of claim 2, wherein a height of the rabbet is equal to a height of the dent.

7. The fastening structure of claim 1, further comprising a slide rail fastened in the case, wherein one of the blocks connects the slide rail to move along the slide rail.

8. The fastening structure of claim 7, further comprising a fastening element disposed on the slide rail for fastening the slide rail and the block connected thereto.

9. The fastening structure of claim 8, wherein the fastening element is a screw.

10. The fastening structure of claim 1, wherein the expansion card is a riser card.

11. A fastening structure for an expansion card, comprising:
    a movable block connected to a case via a slide rail to move along the slide rail horizontally, wherein the movable block has a first slit for a first side of the expansion card vertically slitting into;
    a fixed block fixed in the case and having a second slit for a second side of the expansion card vertically slitting into, wherein an opening of the second slit is facing and parallel to an opening of the first slit;

a first locking tab disposed in the movable block and operated for rotating around the movable block, wherein when the first locking tab being rotated, the first locking tab selectively opens or blocks up the first slit; and a second locking tab disposed in the fixed block and operated for rotating around the fixed block, wherein when the second locking tab being rotated, the second locking tab selectively opens or blocks up the second slit.

12. The fastening structure of claim 11, wherein the first locking tab has a first dent, and when the first locking tab being rotated, the first dent and the first slit being selectively aligned or misaligned, wherein when the first dent and the first slit are aligned, the first dent and the first slit form a continuous passage for the first side of the expansion card passing through, and when the first dent and the first slit are misaligned, a sidewall of the first dent blocks up the first slit.

13. The fastening structure of claim 12, wherein the first locking tab is jammed in a first rabbet disposed on the first side of the expansion card when the sidewall of the first dent blocks up the first slit.

14. The fastening structure of claim 13, wherein a width of a bottom of the first rabbet is longer than the width of an opening of the first rabbet.

15. The fastening structure of claim 14, wherein a width of a top of the first locking tab is about shorter than the width of the bottom of the first rabbet and longer than the width of the opening of the first rabbet.

16. The fastening structure of claim 12, wherein the second locking tab has a second dent, and when the second locking tab being rotated, the second dent and the second slit being selectively aligned or misaligned, wherein when the second dent and the second slit are aligned, the second dent and the second slit form a continuous passage for the second side of the expansion card passing through, and when the second dent and the second slit are misaligned, a sidewall of the second dent blocking up the second slit.

17. The fastening structure of claim 16, wherein the second locking tab is jammed in a second rabbet disposed on the second side of the expansion card when the sidewall of the second dent blocks up the second slit.

18. The fastening structure of claim 11, further comprising a fastening element disposed on the slide rail for fastening the slide rail and the movable block.

19. The fastening structure of claim 18, wherein the fastening element is a screw.

* * * * *